United States Patent [19]

Kaneko et al.

[11] Patent Number: 5,309,073
[45] Date of Patent: May 3, 1994

[54] ELECTRIC VEHICLE CONTROL DEVICE

[75] Inventors: Satoru Kaneko; Ryoso Masaki, both of Hitachi; Sanshiro Obara, Ibaraki; Tsutomu Ohmae; Yuusuke Takamoto, both of Hitachi; Hirohisa Yamamura, Hitachiota, all of Japan

[73] Assignee: Hitachi, Ltd., Tokyo, Japan

[21] Appl. No.: 963,765

[22] Filed: Oct. 20, 1992

[30] Foreign Application Priority Data

Oct. 21, 1991 [JP] Japan .................. 3-272324
Oct. 21, 1991 [JP] Japan .................. 3-272328

[51] Int. Cl.$^5$ .............................. H02J 11/00
[52] U.S. Cl. ....................... 318/500; 307/82
[58] Field of Search ........... 318/138, 139, 254, 500; 180/65.1; 307/18, 23, 25, 29, 43, 44, 45, 46, 48, 52, 64, 80, 82, 85, 86; 361/1

[56] References Cited

U.S. PATENT DOCUMENTS

| | | |
|---|---|---|
| 3,630,304 | 12/1971 | Sahinkaya . |
| 3,675,117 | 7/1972 | Reimers . |
| 3,686,548 | 8/1972 | Onoda et al. ............ 318/138 |
| 3,746,964 | 7/1973 | Guyton . |
| 3,890,551 | 6/1975 | Plunkett ............ 318/376 |
| 4,055,772 | 10/1977 | Leung . |
| 4,092,571 | 5/1978 | Hopkins et al. ............ 318/106 |
| 4,272,716 | 6/1981 | Etienne . |
| 4,928,227 | 5/1990 | Burba et al. ............ 364/424.1 |

FOREIGN PATENT DOCUMENTS 59-61402 4/1984 Japan .
2-220913 9/1990 Japan .

Primary Examiner—Bentsu Ro
Attorney, Agent, or Firm—Evenson, McKeown, Edwards & Lenahan

[57] ABSTRACT

An electric vehicle control device is disclosed, which includes an AC motor for driving a vehicle; a main electric power conversion unit for supplying an AC voltage to the AC motor; a battery for supplying a DC voltage to the main electric power conversion unit; an auxiliary electric power conversion unit connected to the battery and adapted to be connected to a load or a power supply; a controller for controlling the main and auxiliary electric power conversion units so as to act selectively as an inverter or a converter; and a switching unit for giving selectively the AC motor the AC voltage from the main and auxiliary electric power conversion units under control of the controller. In the running mode of the electric vehicle, the controller described above makes the main electric power conversion unit act as an inverter and controls the switching unit so that the AC voltage from the main electric power conversion unit is given to the AC motor. Further, responding to detection of a failure of the main electric power conversion unit, the controller makes the auxiliary electric power conversion unit act as an inverter and controls the switching unit so that the AC voltage from the auxiliary electric power conversion unit is given to the AC motor.

21 Claims, 9 Drawing Sheets

ELECTRIC VEHICLE CONTROL DEVICE

BACKGROUND OF THE INVENTION

1. Field of the Invention

The present invention relates to an electric vehicle control device driven by means of an electric motor, and in particular an electric vehicle control device having a high reliability, capable of running safely, even if a main electric power conversion unit for driving the motor is out of order.

2. Description of the Prior Art

As an example of the prior art electric vehicle control device there is known a method, by which an inverter for driving an AC motor for running is used also as a charger, as described in JP-A-Sho 59-61402. In such an electric vehicle, there are disposed a switch between the inverter and the AC motor and a charging terminal between the inverter and the switch so that a driving mode and a charging mode can be switched by opening and closing the switch. By this method stable charging can be effected without increasing the size of the device.

As another example of the prior art electric vehicle control device there is known a method, by which a motor for an air conditioner is disposed to be driven separately from the motor for running. Concretely speaking, a motor for driving a compressor for the air conditioner is disposed apart from the motor for running and the number of turns of the motor for driving the compressor is controlled by the inverter. By this method cooling and heating are possible at need without changing any characteristics of the motor for running not only at running but also at standing.

SUMMARY OF THE INVENTION

All the prior art techniques described above had a problem that the motor for running cannot drive the vehicle, in the case where the inverter for driving it gets out of order.

Further, in JP-A-Sho 2-220913, there was a problem that the control device is large, because the motor for driving the compressor and the motor for running are driven by separate inverters and a converter for charging, which rectifies an AC voltage for charging a battery, should be disposed separately.

An object of the present invention is to provide an electric vehicle control device capable of running safely, even if a main electric power inverter for driving the motor is out of order.

Another object of the present invention is to provide a device controlling an electric vehicle, on which other loads are mounted, without increasing the size of the control device.

According to an aspect of the present invention an electric vehicle control device includes an AC motor for driving a vehicle; a main electric power conversion unit for supplying an AC voltage to the AC motor; a battery for supplying a DC voltage to the main electric power conversion unit; an auxiliary electric power conversion unit connected to the battery and adapted to be connected to a load or a power supply; a controller for controlling the main and auxiliary electric power conversion units so as to act selectively as an inverter or a converter; and a switching unit for giving the AC motor the AC voltage selectively from one of the main and auxiliary electric power conversion units under control of the controller.

According to another aspect of the present invention an electric vehicle control device includes an AC motor for driving a vehicle; a main electric power conversion unit for supplying an AC voltage to the AC motor; a battery for supplying a DC voltage to the main electric power conversion unit; an auxiliary electric power conversion unit connected to the battery to supply a voltage to a load; a switching unit for giving the motor the voltage selectively from one of the main and auxiliary electric power conversion units; and a controller for controlling the switching unit.

In the running mode of the electric vehicle, the controller described above makes preferably the main electric power conversion unit act as an inverter and controls the switching unit so that the AC voltage from the main electric power conversion unit is given to the AC motor.

According to the present invention, in the running mode of the electric vehicle, the controller makes preferably, responding to detection of a trouble or failure by a unit detecting a trouble or failure in the main electric power conversion unit, the auxiliary electric power conversion unit act as an inverter and controls the switching unit so that the AC voltage from the auxiliary electric power conversion unit is given to the AC motor through the switching unit. In this way, when the main electric power conversion unit is out of order, the AC motor can be driven by the auxiliary electric power conversion unit instead thereof.

More preferably, responding to detection of a trouble by a unit detecting a trouble in the auxiliary electric power conversion unit, the controller makes the main electric power conversion unit act as a converter and controls the switching unit so that the power supply is switched so as to be connected from the auxiliary electric power conversion unit to the main electric power conversion unit. In this way, when the auxiliary electric power conversion unit is out of order, charging can be effected by the main electric power conversion unit instead of the auxiliary electric power conversion unit.

In an example of the present invention, the controller judges that the vehicle is in either one of 3 modes, i.e. normal running, auxiliary running when the main inverter is out of order, and charging, by using the main inverter which is as the main electric power conversion unit and a signal through a charging terminal to effect the running control. In the case of the normal running, the main AC motor is fed with voltage from the main inverter to be driven.

Further, in the case where it is judged that the vehicle is in the auxiliary running due to a trouble in the main inverter, the driving circuit is switched so that the charging converter, which is the auxiliary electric power conversion unit, is used as the inverter for driving the main AC motor. That is, the AC motor is fed with voltage through the charging converter. On the other hand, in the case where a plug is connected to commercial electric power network at standing, it is judged that the battery is being charged, battery charging is effected through the charging converter. Next, in the case where the auxiliary electric power conversion unit is used as an inverter for a load, e.g. as an inverter for an air conditioner, the controller judges that the vehicle is in either one of 2 modes, i.e. normal running and auxiliary running when the main inverter is out of order, to effect running control. In the case of the normal running, the main AC motor is fed with voltage through the main inverter to be driven and further the AC motor for the air conditioner is fed with voltage through the inverter for the air conditioner.

Furthermore, in the case where it is judged that the vehicle is in auxiliary running due to a trouble in the main inverter, the driving circuit is switched so that the inverter for the air conditioner is used as the driving inverter. That is, the main AC motor is fed with voltage through the inverter for the air conditioner. By switching the driving circuit as described above, it is possible to provide an electric vehicle capable of running safely particularly without coming to a standstill on a road, and in particular at an intersection or a railroad crossing, even when the main inverter is out of order.

Still further, in the charging mode, it is possible to charge the battery through the main inverter by switching the charging circuit to make the the main inverter act as the converter.

Still further, in an example of the present invention, the control device can be made compact, because the charging converter functions both for charging the battery and for a load (e.g. air conditioner).

DESCRIPTION OF THE PREFERRED EMBODIMENTS

Prior to explanation of several preferred embodiments of the present invention, the conception of the electric vehicle control device according to the present invention will be explained, referring to FIG. 1.

Figure 1:
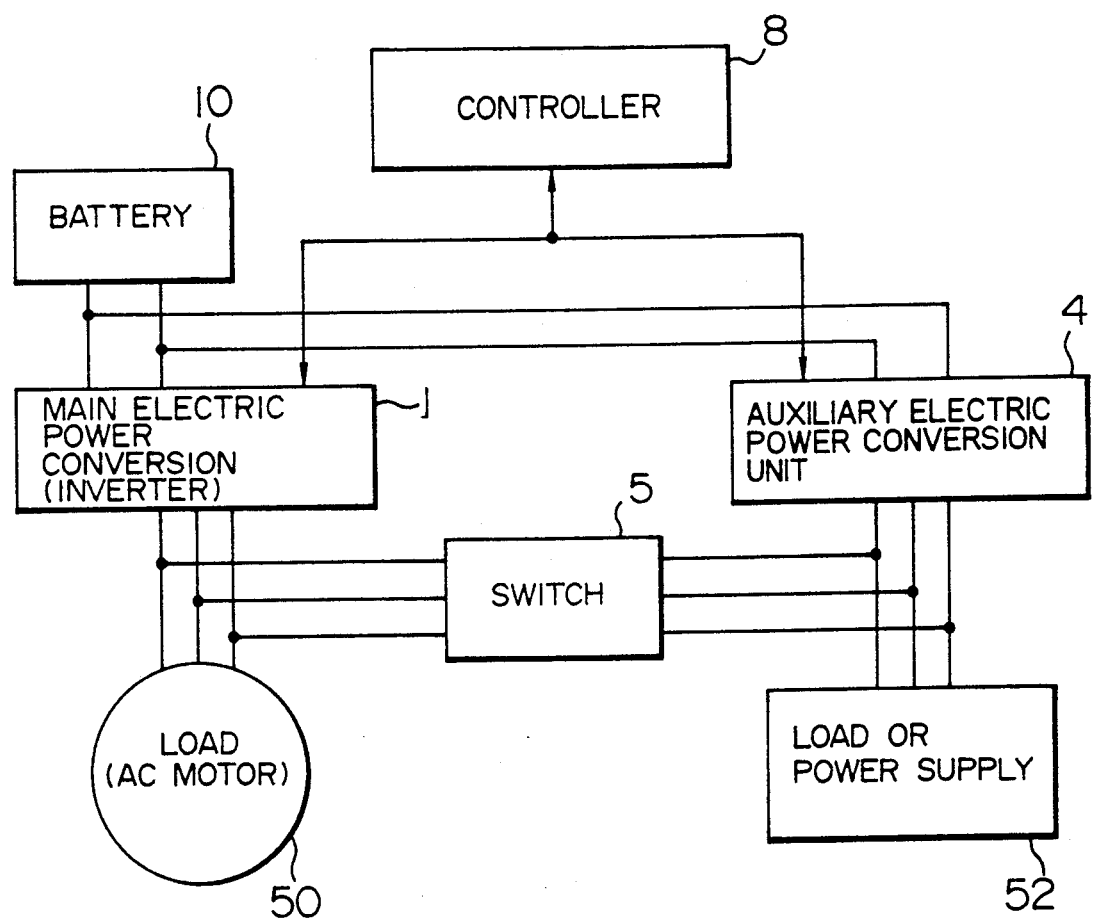
FIG. 1 is a conceptual block diagram indicating an electric vehicle control device according to the present invention.

In FIG. 1, a battery 10 is connected to a main and an auxiliary electric power conversion unit 1 and 4. The main electric power conversion unit (here an inverter) 1 inverts a DC voltage from the battery 10 into an AC voltage, which is supplied to a load (e.g. an AC motor for driving wheels or tires of the vehicle) 50 to drive them. The auxiliary electric power conversion unit 4 is connected to a load or a power supply 52. In the case where it is connected to the load, it inverts a DC voltage from the battery 10 into an AC voltage, which is supplied to a load 52 to drive it. In the case where it is connected to the power supply, e.g. an AC power supply, it converts an AC voltage from the power supply into a DC voltage, which is supplied to the battery 10 to charge it.

A controller 8 controls selectively the main and auxiliary electric power conversion units 1 and 4 so as to act as inverters or converters. That is, the main electric power conversion unit 1 is controlled so as to be operated normally as an inverter. On the other hand, the auxiliary electric power conversion unit 4 is controlled so as to be operated as an inverter, when 52 represents the load, and as a converter, when 52 represents the power supply. Further, the controller 8 judges whether the main electric power conversion unit 1 is out of order or not. When it detects a trouble, it makes the auxiliary electric power conversion unit 4 act as an inverter and at the same time turns-on a switch 5 so that the AC voltage from the auxiliary electric power conversion unit 4 is given to a load 50 through the switch 5 to drive the load 50 by the auxiliary electric power conversion unit 4 instead of the main electric power conversion unit 1. The switch 5 is normally in an OFF state.

Or, preferably, the controller 8 judges whether the auxiliary electric power conversion unit 4 is out of order or not. When it detects a trouble, the battery 10 may be charged by the main electric power conversion unit 1 instead of the auxiliary electric power conversion unit 4. That is, in the charging mode, when the controller 8 detects a trouble in the auxiliary electric power conversion unit 4, it turns-on the switch 5 and at the same time makes the main electric power conversion unit 1 act as an converter so that the AC voltage from the power supply 52 is given to the main electric power conversion unit 1 through the switch 5 to charge the battery 10 by a DC voltage output thereof.

Now several embodiments of the present invention based on the conception described above will be explained, referring to the attached drawings. In the following embodiments, elements having same functions are denoted by same reference numerals and duplicate explanation therefor will be omitted.

Figure 2:
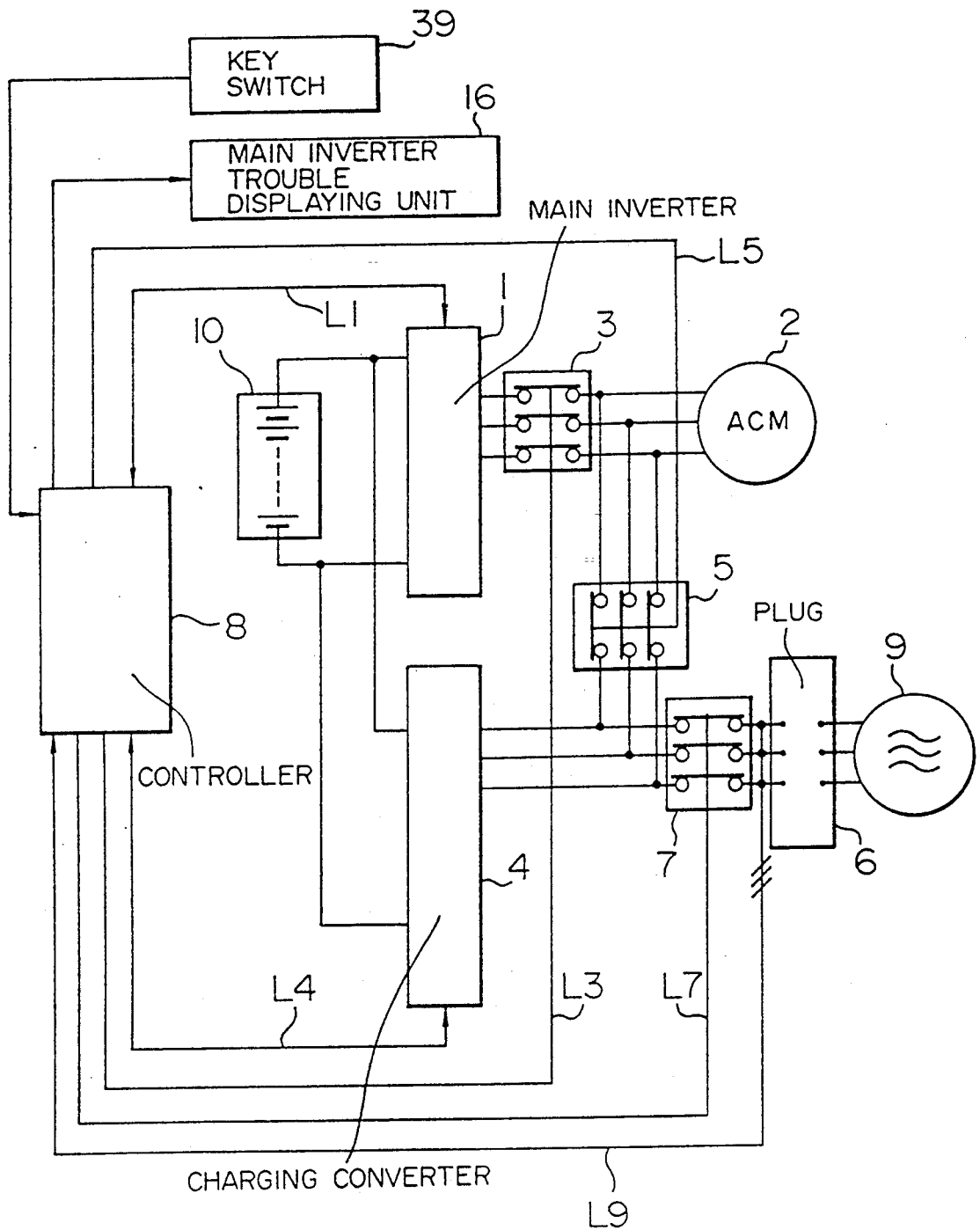
FIG. 2 is a circuit diagram indicating a first embodiment of the present invention, in which the charging converter is used as the driving inverter, when the main inverter is out of order.

FIG. 2 is a circuit diagram indicating a first embodiment of the present invention.

Referring to FIG. 2, in an electric vehicle where a main AC motor (corresponding to the load 50 in FIG. 10) driving e.g. tires or wheels of the vehicle is driven by the main electric power conversion unit 1 acting normally as an inverter, e.g. main inverter, when the main inverter is out of order, the main AC motor is driven by the auxiliary electric power conversion unit 4, which serves normally for charging the battery, e.g. charging converter, instead of the main inverter.

In FIG. 2, there are disposed a normal running switch 3 between the output of the main inverter 1 and the main AC motor 2; an auxiliary running switch 5 between the main AC motor side of the normal running switch 3 and the input of the charging converter 4; and a charging switch 7 between a plug 6 and a connecting point between the auxiliary running switch 5 and the input of the charging converter. These normal running switch 3, auxiliary running switch 5 and charging switch 7 as well as the main inverter 1 and the charging converter 4 are controlled by the controller 8. Further the plug 6 is connected to an external commercial electric power network 9 (corresponding to the power supply 52 in FIG. 1) to charge the battery.

That is, the controller 8 has a function to detect electric power from the power supply 9 at a connecting point e.g. between the plug 6 and the switch 7. When electric power is detected, the controller 8 turns over the switches 3, 5 and 7 so that the battery 10 is charged by the charging converter 4.

Further the controller 8 has a function to detect a trouble in the main inverter 1. In normal running, when it detects a trouble in the main inverter 1, it turns over the switches 3, 5 and 7 by giving them switching signals through signal lines L3, L5 and L7, respectively, and at the same time it makes the charging converter 4 act as an inverter by giving a control signal thereto through a signal line L4 to drive the main AC motor by means of the charging converter. In addition, the controller 8 has a function to detect a trouble in the charging converter 4. When it detects a trouble in the charging converter at charging the battery 10 by means of the charging converter 4, it turns over the switch 5 and at the same time makes the main inverter 1 act as a converter by giving a control signal thereto through a signal line L1 so that the battery is charged by the main inverter.

The controller 8 effects detection of a trouble in the main inverter 1 as follows. That is, the controller 8 receives an output voltage from the main inverter 1 through a signal line L1 and it judges that the main inverter 1 is out of order or faulty, in the case where the arm voltage is below a predetermined voltage.

Further, as another method, the controller 8 may receive an output current of the main inverter 1 and judge that the main inverter 1 is out of order, in the case where the output current exceeds a tolerable current. Detection of a trouble in the charging inverter 4 may be effected also in a similar way. In addition, a unit for detecting troubles in the main and auxiliary conversion units may be disposed outside of the controller.

Next the operation of the control device indicated in FIG. 2 will be explained by using a relation indicated TABLE 1 between the operation modes and ON and OFF states of different switches.

TABLE 1

| OPERATION MODE | SWITCHES | | |
|---|---|---|---|
| | SW3 | SW5 | SW7 |
| NORMAL RUNNING | ON | OFF | OFF |
| AUXILIARY RUNNING DUE TO FAILURE OF MAIN INVERTER ETC. | OFF | ON | OFF |
| CHARGING | OFF | OFF | ON |

At first, in the ON state of a key switch 39, in the case where the controller 8 receives a signal from the main inverter 1 and decides that the main inverter 1 is normal, it decides that the vehicle is in the normal running mode, turns-on the normal running switch 3, turns-off the auxiliary running switch 5 and turns-off the charging switch 7 so that the main AC motor 2 is driven by the main inverter 1.

On the other hand, when the main inverter 1 is out of order, the controller 8 detects it, judges that the vehicle is in the auxiliary running mode, stops the main inverter 1, and displays the trouble on a main inverter trouble indicating unit, e.g. a main inverter trouble displaying unit 16. The displaying unit 16 may be e.g. a lamp, which is lightened at trouble.

In the auxiliary running mode, the controller 8 turns-off automatically the normal running switch 3, turns-on the auxiliary running switch 5 and turns-off the charging switch 7 so that the charging converter 4 is operated as an inverter and that the electric vehicle can be driven safely by driving the main AC motor 2 in this way.

Further, when the key switch 39 is turned off and the plug 6 is connected with the external commercial electric power network 9 at standing, the controller 8 detects electric power from the external commercial electric power network 9 and judges that the vehicle is in the charging mode. In this way the controller 8 turns-off the normal running switch 3, turns-off the auxiliary running switch 5 and turns-on the charging switch 7 so that the driving battery 10 is charged through the charging converter 4.

By this method, the vehicle can run safely by means of the charging converter, even if the main inverter is out of order. In the case where the charging converter has a small capacity, it is possible also to use it only for moving the electric vehicle to a safe place.

On the other hand, in the charging mode, when the controller 8 detects a trouble in the charging converter 4, it stops automatically the charging converter 4, turns-on the switches 3 and 5 and at the same time makes the main inverter 1 act as a converter to charge the battery 10 through the main inverter 1. In this case, a charging converter trouble display unit may be disposed to display the trouble. As described above, even if the charging converter is out of order, it is possible also to charge the battery by means of the main inverter.

Furthermore, since the normal running switch and the auxiliary running switch are turned off during the charging by means of the charging converter 4, it is possible also to prevent start due to an erroneous operation during the charging.

Figure 3:
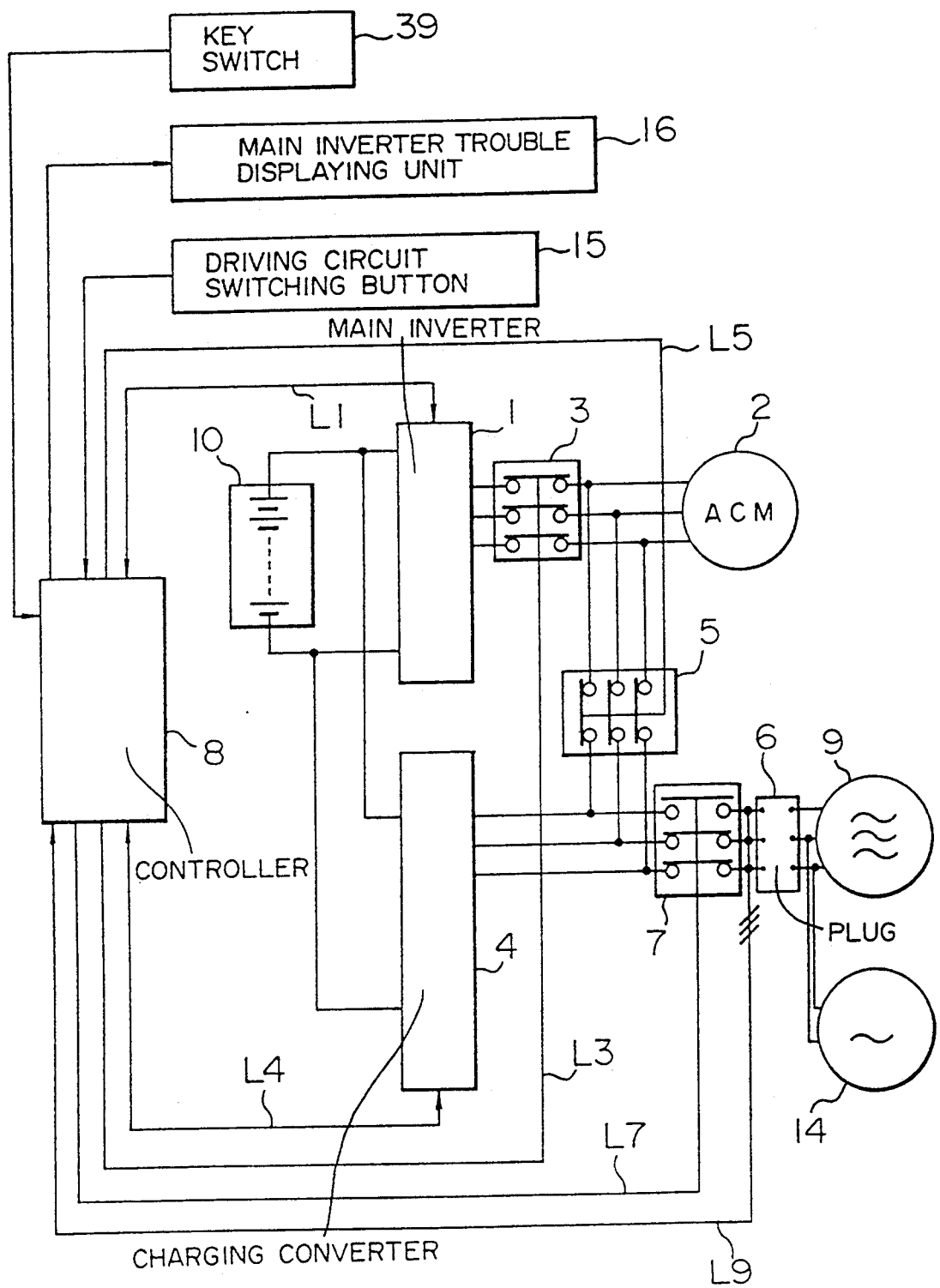
FIG. 3 is a circuit diagram indicating a second embodiment of the present invention, in which the driving circuit in FIG. 2 is switched manually and the battery can be charged from two-phase commercial electric power network.
Figure 4:
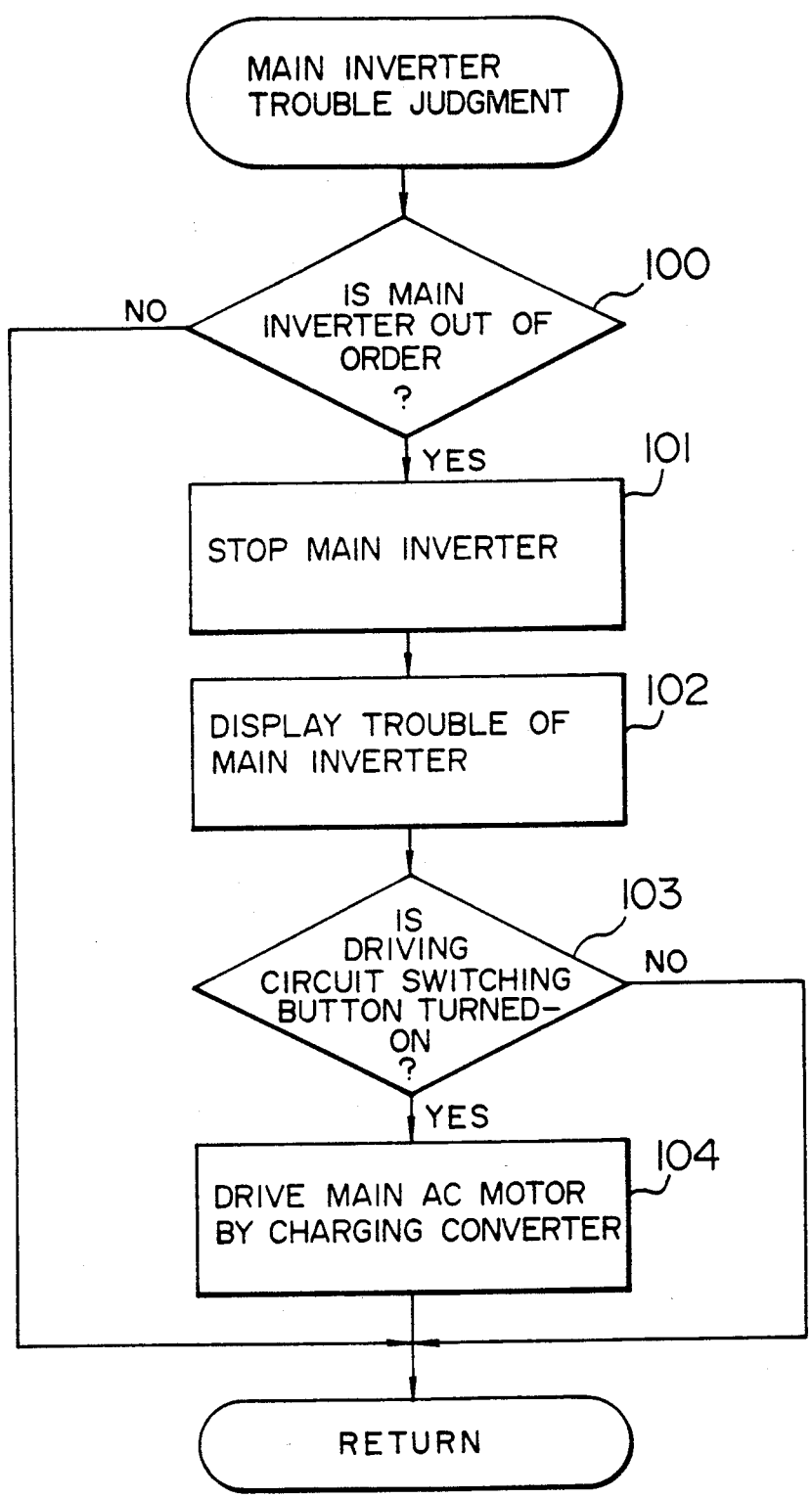
FIG. 4 is a flow chart for explaining the operation of the embodiment indicated in FIG. 3.

Now a second embodiment, in which the driving circuit for driving the main AC motor is switched over manually, will be explained, referring to FIGS. 3 and 4. FIG. 3 is a circuit diagram of the embodiment, in which the driving circuit is switched over manually, and FIG. 4 is a flow chart indicating program processing for the controller 8 at that time.

In the present embodiment, a driving circuit turning-over switch, e.g. a button 15, is disposed so that the driving circuit can be turned-over manually, when the main inverter is out of order. In the present embodiment, as clearly seen from FIGS. 3 and 4, at first, in STEP 100, in the normal running, it is checked whether the main inverter 1 is out of order or not. If the main inverter 1 is normal, the process is immediately returned. On the contrary, if the main inverter 1 is out of order, the process proceeds to STEP 101 and the main inverter is stopped. Thereafter, in STEP 102, it is displayed on the display unit 16 that the main inverter 1 is out of order so that a driver can recognize it. In STEP 103, the state of the driving circuit switching button 15 is checked and if it is turned off, the process is immediately returned. If it is turned on, the main AC motor drive is switched to that effected by the charging converter instead of the main inverter. That is, similarly to the first embodiment, the charging converter 4 is made act as an inverter, at the same time the switch 5 is turned on and the switch 3 is turned off. After the driver has confirmed in this way that the main inverter 1 is out of order, he can switch manually the driving circuit. Further, as indicated in FIG. 3, the battery may be charged even with a single or three-phase commercial electric power network 14.

Further, in the charging mode, when the charging converter 4 is out of order, it may be displayed and the charging circuit may be switched, responding to turning-on of the charging circuit switching button, as described in the above embodiment.

Next a third embodiment of the present invention will be explained, referring to FIG. 5.

In the present embodiment, a load, e.g. an AC motor 12 for an air conditioner (corresponding to the load 52 in FIG. 1), is disposed instead of the AC power supply 9 and the plug 6 in the first embodiment and an inverter, e.g. an inverter 13 for an air conditioner, is used instead of the charging converter 4 as the auxiliary electric power conversion unit.

Figure 5:
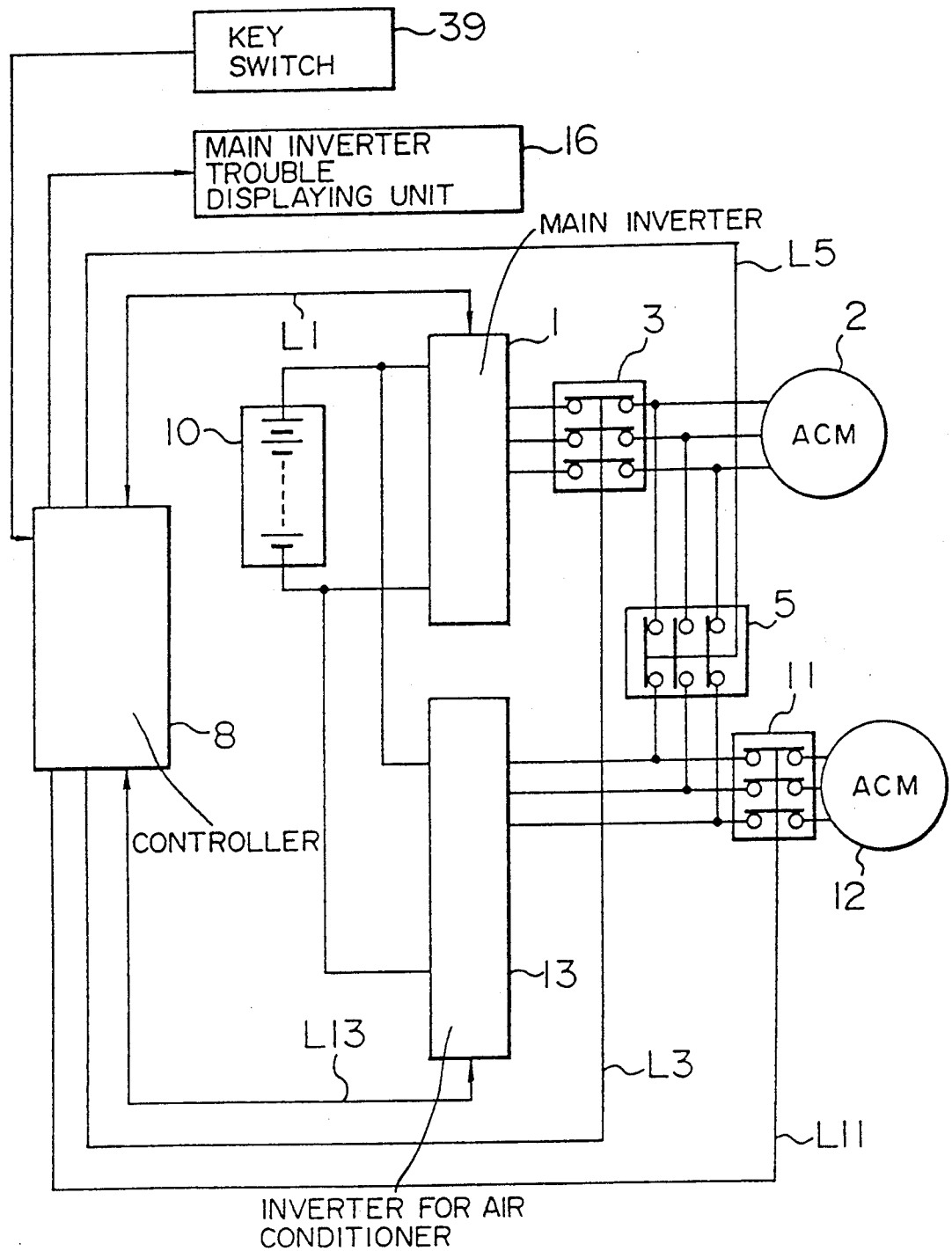
FIG. 5 is a circuit diagram indicating a first embodiment of the present invention, in which the inverter for an air conditioner is used as the driving inverter, when the main inverter is out of order.

FIG. 5 is a circuit diagram of the third embodiment, in which the main AC motor in the electric vehicle is driven by the inverter for an air conditioner, when the main inverter is out of order. There are disposed the normal running switch 3 between the output of the main inverter 1 and the main AC motor 2, the auxiliary running switch 5 between the motor side of the normal running switch 3 and the output of the inverter 13 for an air conditioner, and an air conditioner operating switch 11 between the output of the inverter 13 for an air conditioner and the AC motor 12 for an air conditioner. These normal running switch 3, auxiliary running switch 5 and air conditioner operating switch 11 as well as the main inverter 1 and the inverter 13 for an air conditioner are controlled by switching signals and control signals sent from the controller 8 through the signal lines L3, L5, L11, L1 and L13.

Here the operation of the embodiment indicated in FIG. 5 will be explained by using a relation between the operation modes and opened and closed states of different switches, indicated in TABLE 2.

TABLE 2

| OPERATION | SWITCHES | | |
|---|---|---|---|
| | SW3 | SW5 | SW11 |
| NORMAL RUNNING | ON | OFF | ON |
| AUXILIARY RUNNING DUE TO FAILURE OF MAIN INVERTER ETC. | OFF | ON | OFF |

At first, in a state where the key switch 39 is turned on, the controller 8 receives a signal from the main inverter 1. When it judges that the main inverter 1 is normal, it decides that the vehicle is in the normal running mode. Therefore it turns-on the normal running switch 3, turns-off the auxiliary running switch 5, and turns-on the air conditioner operating switch 11 so as to make the main inverter 1 drive the main AC motor 2 and further at need to make the inverter 13 for an air conditioner drive the AC motor 12 for the air conditioner. On the contrary, in the case where the main inverter 1 is out of order, the controller 8 detects it and decides that the vehicle is in the auxiliary running mode. Therefore it turns-off the normal running switch 3, turns-on the auxiliary running switch 5, and turns-off the air conditioner operating switch 11 so as to make the inverter 13 for an air conditioner drive the main AC motor 2 to make the electric vehicle run safely. In this way, even if the main inverter for driving the main AC motor is out of order, the electric vehicle can run safely by using the inverter for the air conditioner. Further, similarly to the second embodiment, a driving circuit switching button may be disposed and after the driver has confirmed a trouble in the main inverter, he may switch the drive of the main AC motor to the drive by the inverter for the air conditioner by pushing the driving circuit switching button.

Figure 6:
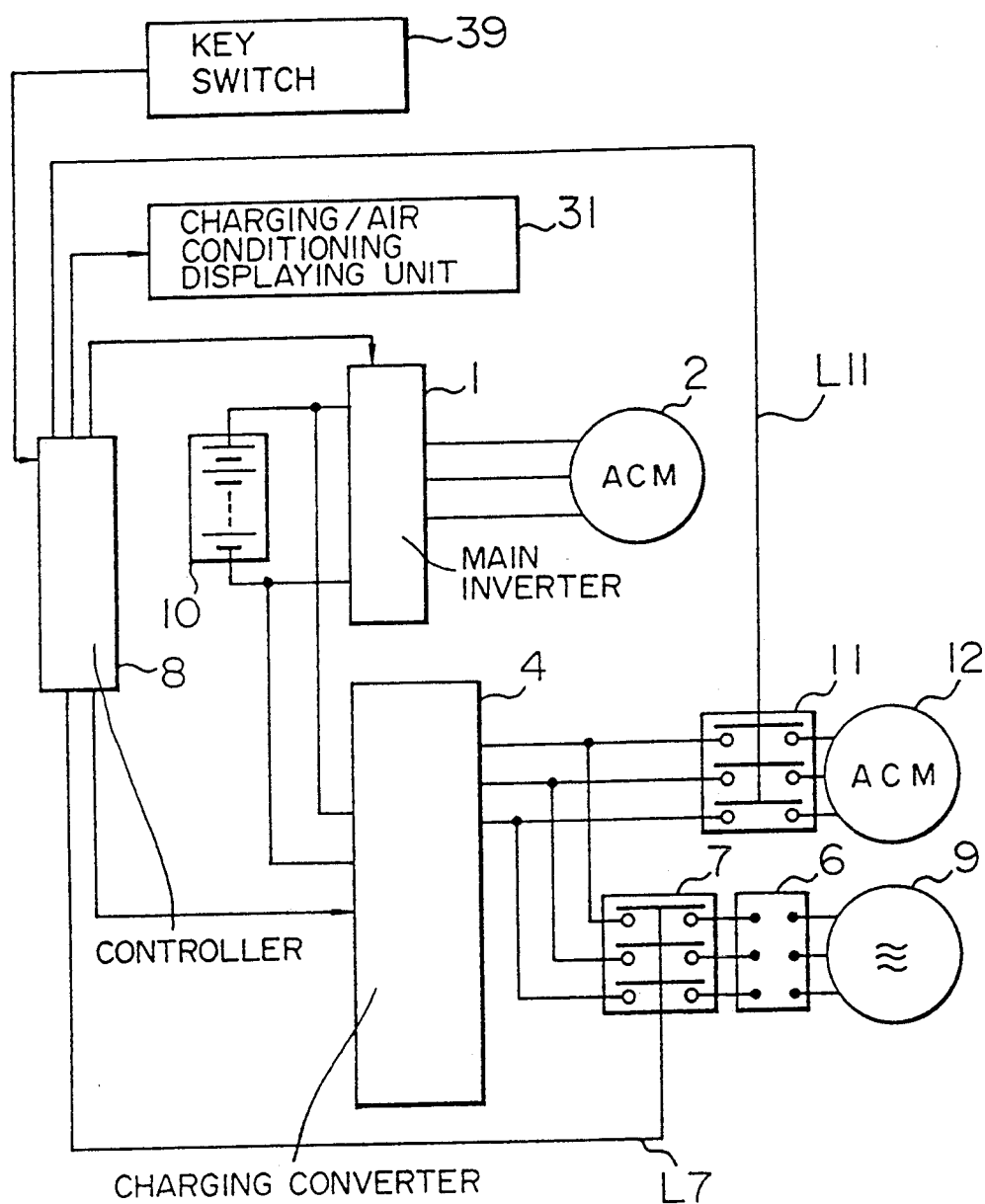
FIG. 6 is a circuit diagram indicating a fourth embodiment of the present invention.

FIG. 6 is circuit diagram showing a fourth embodiment, in which the motor for the air conditioner is fed with voltage by the charging converter in the electric vehicle. In FIG. 6, there are disposed an air conditioner operating switch 11 between the charging converter 4 and the motor 12 for an air conditioner and a charging switch 7 between the charging converter 4 and the charging plug 6. These charging converter 4, air conditioner operating switch 11, charging switch 7 and the main inverter 1 are controlled by the controller 8. Further the plug 6 is connected to external commercial electric power network 9 to charge the battery. A charging-air conditioning displaying unit 31 displays that the battery is being charged, in the charging mode, and when the air conditioner is switched on, this is displayed thereon, by an instruction from the controller 8.

Now the operation of the embodiment indicated in FIG. 6 will be explained. At first, in the case where the key switch 39 is turned on, the controller automatically turns-on the air conditioner operating switch 11 and turns-off the charging switch 7 so that the motor 12 for the air conditioner can be fed with voltage a need by the charging converter 4.

On the other hand, in the case where the key switch 39 is turned off, the controller automatically turns-off the air conditioner operating switch 11 and turns-on the charging switch 7 so that the driving battery 10 can be charged by the charging converter 4. The air conditioner can be mounted without increasing the size of the control device owing to the the construction, in which the motor 12 for the air conditioner can be fed with voltage by the charging converter 4.

Figure 7:
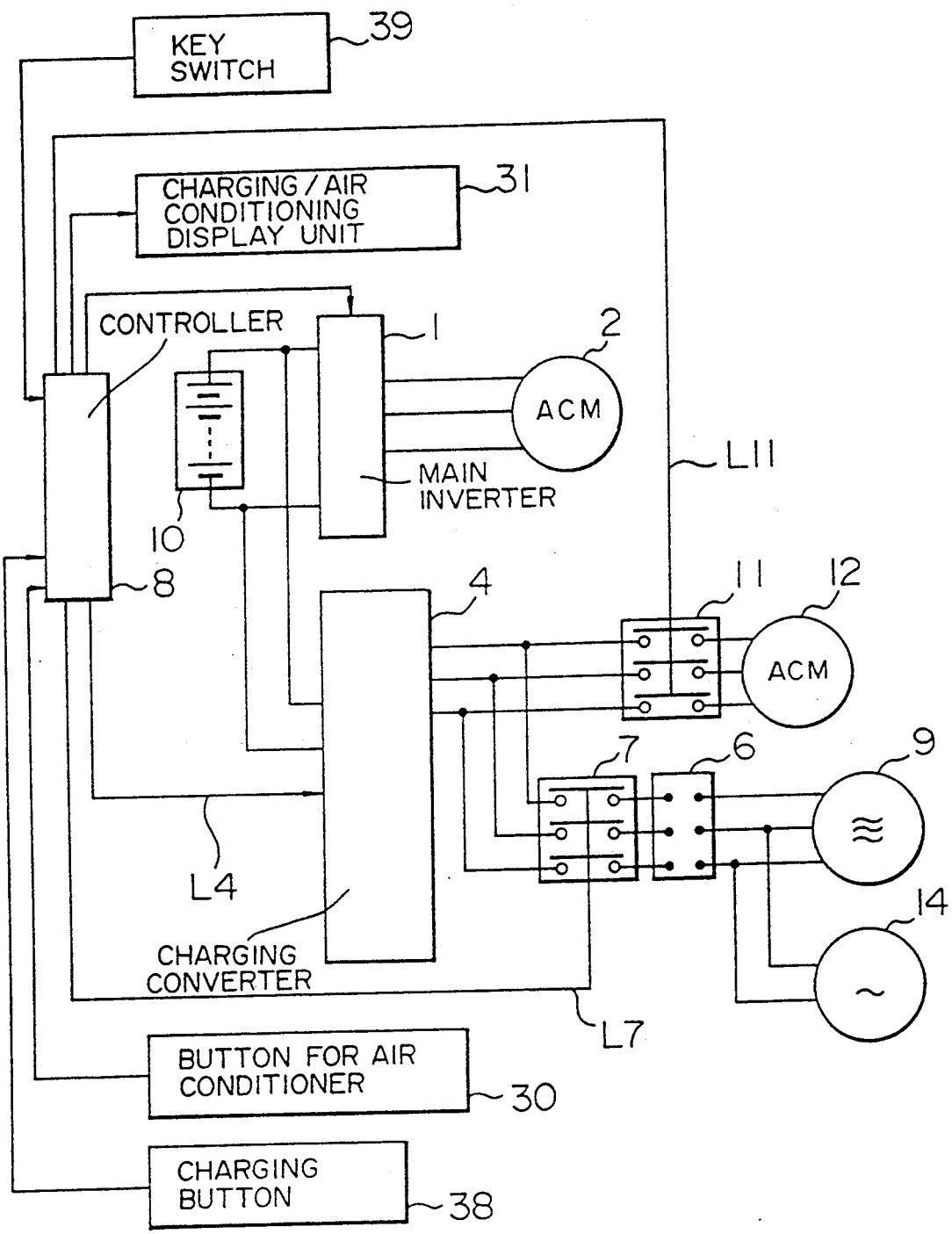
FIG. 7 is a circuit diagram indicating a fifth embodiment of the present invention, in which the functions of the charging converter in FIG. 7 is switched manually.

Next a fifth embodiment, in which switching of functions of the charging converter 4 in the embodiment indicated in FIG. 6 is effected manually, will be explained, referring to FIG. 7. FIG. 7 is a circuit diagram showing the construction of the fifth embodiment, in which switching of functions of the charging converter 4 is effected manually. In the present embodiment there are disposed a switch for the air conditioner, e.g. button 30, and a charging switch, e.g. button 38, in addition to the embodiment indicated in FIG. 6.

In FIG. 7, in the case where the key switch 39 is turned on, when an operator pushes-down the button 30 for the air conditioner, it is displayed on the displaying unit 31 that the switch for the air conditioner is turned on. On the contrary, in the case where the key switch 39 is turned off, when he pushes-down the charging button 38, it is displayed on the displaying unit 31 that the battery 10 is being charged.

In this way the driver can switch-over manually the functions. Further for the sake of safety the circuit can be so constructed that the switch 7 is turned off so that the battery cannot be charged, when the key switch 39 is turned on. Furthermore the battery can be charged by a single or three-phase commercial electric power network, as indicated in FIG. 7.

Figure 8:
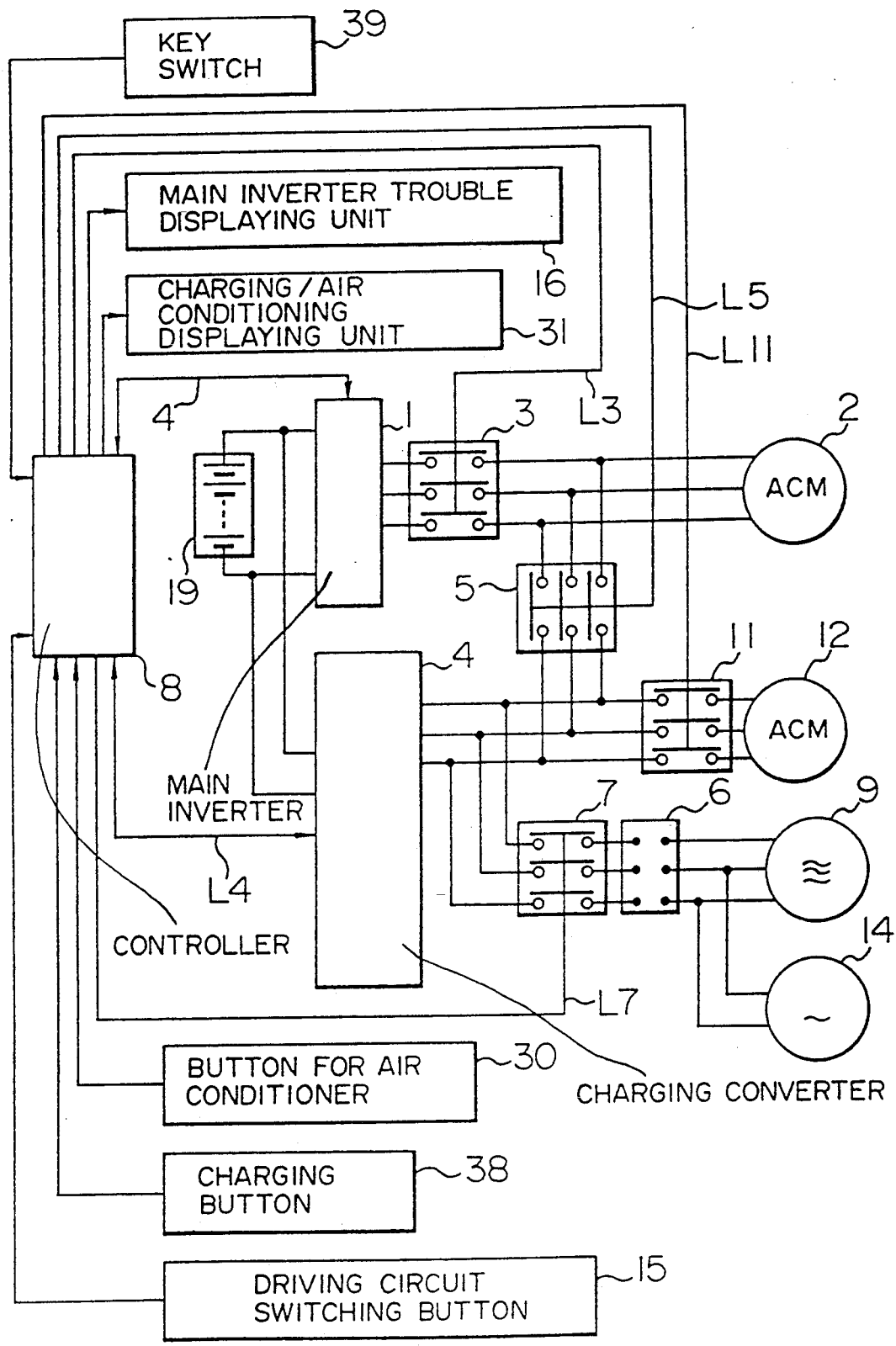
FIG. 8 is a circuit diagram indicating a sixth embodiment of the present invention, in which the charging converter in FIG. 7 is used as the inverter for driving the main AC motor, when the main inverter is out of order.

Next a sixth embodiment of the present invention will be explained, referring to FIG. 8. In the present embodiment, in addition to the embodiment indicated in FIG. 7, the AC motor 2 is driven by the charging converter 4 instead of the main inverter, when the latter is out of order. For this purpose, in the present embodiment, there are disposed an air conditioner operating switch 11 between the charging converter 4 and the motor 12 for the air conditioner, a charging switch 7 between the charging converter 4 and the charging plug 6, and a normal running switch 3 between the main inverter 1 and the main AC motor 2. Further the output side of the main inverter 1 and the input side of the charging converter 4 are connected to each other through the auxiliary running switch 5. These charging converter 4, air conditioner operating switch 11, charging switch 7, normal running switch 3, auxiliary running switch 5 and the main inverter 1 are controlled by the controller 8.

Here the operation of the embodiment indicated in FIG. 8 will be explained, referring to a flow chart indicated in FIG. 9. TABLE 3 indicates opened and closed states of various switches in the different operation modes.

TABLE 3

| | SWITCHES | | | |
|---|---|---|---|---|
| OPERATION MODE | SW11 | SW7 | SW3 | SW5 |
| NORMAL RUNNING (WHEN AIR CONDITIONER WORKS) | ON | OFF | ON | OFF |
| AUXILIARY RUNNING (WHEN MAIN INVERTER IS FAULTY) | OFF | OFF | OFF | ON |
| CHARGING | OFF | ON | OFF | OFF |

Figure 9:
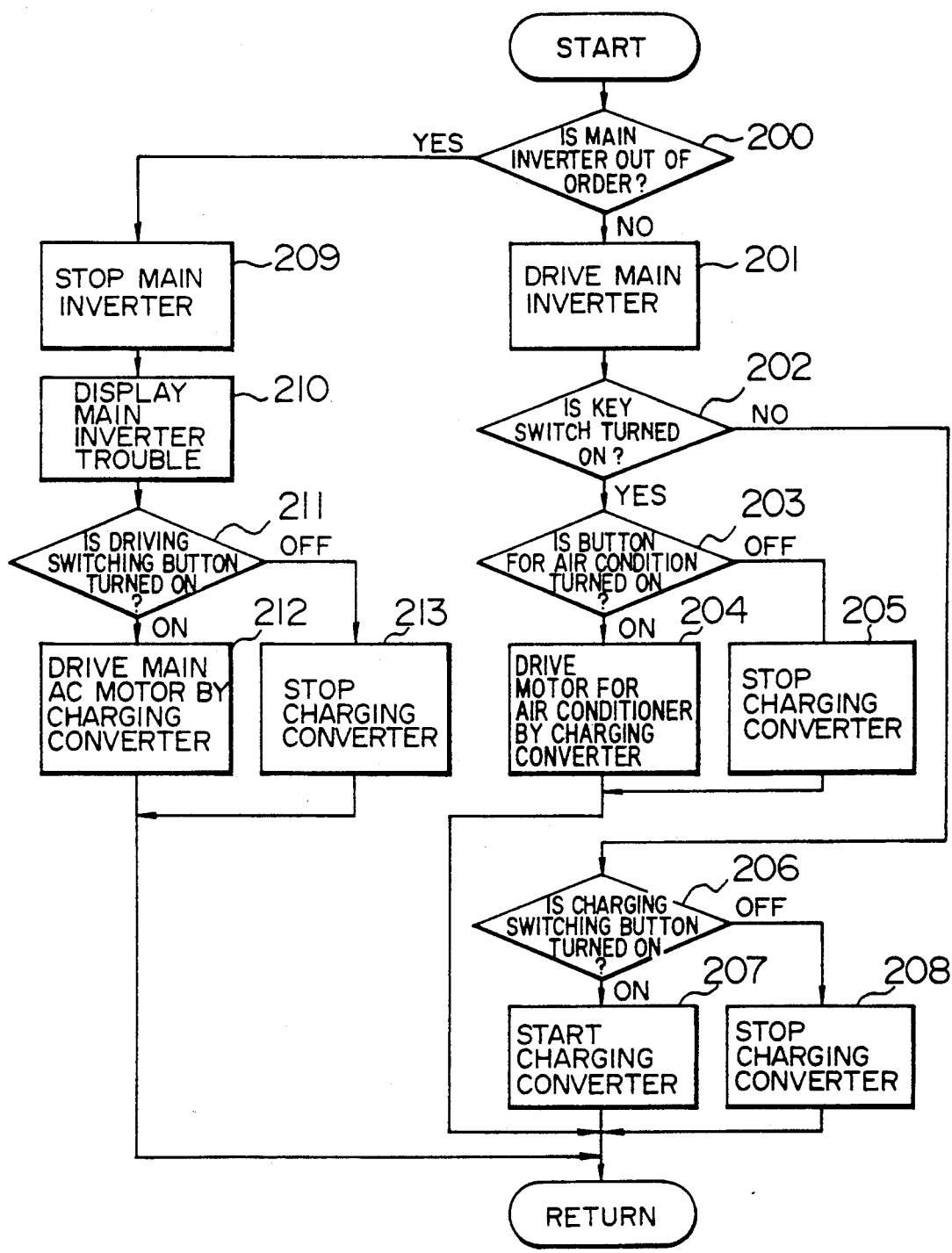
FIG. 9 is a flow chart for explaining the operation of the embodiment indicated in FIG. 8.

FIG. 9 is a flow chart indicating a program processing for the controller 8 indicated in FIG. 8 and the operation of the present embodiment will be explained by using this flow chart. At first, in STEP 200, the controller receives a signal from the main inverter 1 to check whether the main inverter 1 is out of order or not. In the case where it judges that the main inverter 1 is normal, it decides that the vehicle is in the normal running. Then, in STEP 201, it turns-on the normal running switch 3 and turns-off the auxiliary running switch 5 so that the AC motor 2 is fed with voltage by the main inverter 1. Further, in STEP 202, it checks whether the key switch 39 is turned on or not. If the key switch 39 is turned on, it checks in STEP 203 the state of the button 30 for the air conditioner. If the button 30 is turned on, it turns-on the air conditioner operating switch 11 and turns-off the charging switch 7 so that the charging converter 4 is made act as an inverter and the motor 12 for the air conditioner can be fed with voltage by the converter 4. On the contrary, if the button 30 for the air conditioner is turned off, in STEP 205, the controller 8 gives the charging converter 4 a signal through a signal line L4 to stop it.

On the other hand, if in STEP 202 the key switch 39 is turned off, the process proceeds to STEP 206. In STEP 206, the controller checks the charging button 38. If the button 38 is turned on, in STEP 207, it turns-off the air conditioner operating switch and turns-on the charging switch 7 so that the battery 10 can be charged by the charging converter 4. On the contrary, if the charging button 38 is turned off, it stops the charging converter 4 in STEP 208.

Next, in the case where the controller 8 judges in STEP 200 that the main inverter 1 is out of order, in STEP 209 it gives the main inverter 1 a signal through a signal line L1 to stop it. At the same time, in STEP 210, a trouble in the main inverter 1 is displayed by the trouble displaying unit 16 at a place, where the driver can easily recognize it. Thereafter, in STEP 211, the controller 8 checks the driving circuit switching button 15. If the button 15 is turned on, it decides that the vehicle is in the auxiliary running mode. Then, in STEP 212, it turns-off the normal running switch 3, turns-on the auxiliary running switch 5, turns-off the air conditioner operating switch 11 and turns-off the charging switch 7 so that the main AC motor 2 is fed with voltage by the charging converter 4 to drive safely the electric vehicle. On the contrary, if the driving circuit switching button 15 is turned off, in STEP 213, it stops the charging converter 4. In this way, even if the main inverter is out of order, the electric vehicle comes never to a standstill on a road, and in particular at an intersection or a railroad crossing and thus the electric vehicle can run safely. In addition, it is possible to prevent start of the vehicle during the charging by turning-off both the normal running switch 3 and the auxiliary running switch 5 during the charging.

Further, even if the charging converter 4 is out of order, it is possible to charge the battery by means of the main inverter 1. This can be realized by making the main converter 1 act as a converter by a signal from the controller 8 through the control line L1, turning-on, -off, -on and -on the switches 7, 11, 5 and 3, respectively, feeding the main inverter 1 with electric power from the power supply 9 through the switches 7, 5 and 3, and charging the battery 10 with current from the main inverter 1.

It is also possible to drive the motor 11 for the air conditioner by three-phase external commercial electric power network 9 by turning-on, -on and -off the switches 7, 11 and 5, respectively.

Further, when the charging converter 4 is out of order, the motor 12 for the air conditioner may be driven by the main inverter 1. This can be realized by turning-on, -on and -off the switches 5, 11 and 7, respectively, and giving the motor 12 the output of the main inverter 1 through the switches 3, 5 and 11. In this case, since electric power consumption of the motor 12 is generally smaller than that consumed by the motor 2, influences thereof on the running are slight.

Switching of the driving circuit for the main AC motor 2 and switching of the functions of the charging converter can be effected both automatically and manually.

Although, in the different embodiments described above, the case where tires are driven by an AC motor has been described, the above system can be applied to the case where the tires are driven by a DC motor. Further the controller can control both digital circuits and analogue circuits. Furthermore troubles, etc. can be announced by voice, etc. instead of displaying them on the displaying unit in the different embodiments described above.

As explained above, according to the present invention, even if the main inverter is out of order, it is possible to use the charging converter or the inverter for an air conditioner as the inverter for driving the main motor by connecting the output side of the main inverter serving as the main electric power conversion unit with the input side of the charging converter serving as an auxiliary electric power conversion unit or the output side of the inverter for an air conditioner serving as an auxiliary electric power conversion unit through switches and further by supervising the state of the main inverter. In this way an effect can be obtained that the electric vehicle comes never to a standstill on a road, and in particular at an intersection or a railroad crossing and that it can move rapidly to a safe place.

In addition, the air conditioner can be mounted without increasing the size of the control device owing to the fact that a load, e.g. a motor for an air conditioner, can be fed with voltage by the charging converter.

What is claimed is:

1. An electric vehicle control device comprising:
   an AC motor for driving a vehicle;
   a main electric power conversion unit for supplying an AC voltage to said AC motor;
   a battery for supplying a DC voltage to said main electric power conversion unit;
   an auxiliary electric power conversion unit connected to said battery and adapted to be connected to a load or a power supply;
   a controller for controlling the main and auxiliary electric power conversion units so as to act selectively as an inverter or a converter; and
   switching means for applying the AC voltage to said AC motor selectively from one of said main and auxiliary electric power conversion units under control of said controller.

2. An electric vehicle control device according to claim 1, wherein in running mode of the electric vehicle, said controller makes said main electric power conversion unit act as an inverter and controls said switching means so that the AC voltage from said main electric power conversion unit is given to said AC motor.

3. An electric vehicle control device according to claim 2, further comprising:
   means for detecting failure in said main electric power conversion unit;
   wherein responding to detection of a failure by said means for detecting failure, said controller makes said auxiliary electric power conversion unit act as an inverter and controls said switching means so that the AC voltage from said auxiliary electric power conversion unit is given to said AC motor through said switching means.

4. An electric vehicle control device according to claim 2, further comprising:
   means for detecting troubles in said main electric power conversion unit;
   means for informing a driver of the vehicle of a trouble in said main electric power conversion unit, responding to detection of the trouble by said means for detecting troubles; and
   means for instructing said controller to give said AC motor the AC voltage from said auxiliary electric power conversion unit in lieu of said main electric power conversion unit;
   wherein responding to an instruction from said instructing means, said controller makes said auxiliary electric power conversion unit act as an inverter and controls said switching means so that the AC voltage from said auxiliary electric power conversion unit is given to said AC motor.

5. An electric vehicle control device according to claim 2, wherein said controller determines that the vehicle is in a running mode, when a key switch is turned on.

6. An electric vehicle control device according to claim 1, wherein
   said auxiliary electric power conversion unit is connected to a power supply; and
   in a charging mode of the electric vehicle, said controller makes said auxiliary electric power conversion unit act as a converter so as to charge said battery by a DC current from said auxiliary electric power conversions unit, responding to connection of said auxiliary electric power conversion unit to said power supply.

7. An electric vehicle control device according to claim 6, further comprising:
   means for detecting troubles in said auxiliary electric power conversions unit; and
   means for switching said auxiliary electric power conversion unit to said main electric power conversion unit to connect said main electric power conversion unit to said power supply;
   wherein responding to detection of a trouble by said means for detecting troubles, said controller makes said auxiliary electric power conversion unit act as a converter and controls said switching means so that is switches said auxiliary electric power conversions unit to said main electric power conversion unit to connect said main electric power conversion unit to said power supply.

8. An electric vehicle control device according to claim 6, further comprising:
   means for detecting troubles in said auxiliary electric power conversion unit;
   means for informing a driver of the vehicle of a trouble in said auxiliary electric power conversion unit, responding to detection of the trouble by said means for detecting troubles;
   means for switching said auxiliary electric power conversion unit to said main electric power conversion unit to connect said main electric power conversion unit to said power supply; and
   means for instructing said controller to switch said auxiliary electric power conversion unit to said main electric power conversion unit to connect said main electric power conversion unit to said power supply;
   wherein responding to an instruction from said instructing means, said controller makes said main electric power conversion unit act as a converter and controls said switching means so that it switches said auxiliary electric power conversion unit to said main electric power conversion unit to connect said main electric power conversion unit to said power supply.

9. An electric vehicle control device according to claim 6, wherein said controller determines that the vehicle is in a charging mode, when a key switch is turned off.

10. An electric vehicle control device according to claim 6, wherein said controller determines that the vehicle is in a charging mode, when a key switch is turned off and instructs a charging instructing means to charge the battery.

11. An electric vehicle control device according to claim 1, wherein
    said auxiliary electric power conversion unit is connected to a load; and
    in a running mode of the electric vehicle, said controller makes said main electric power conversion unit act as an inverter and controls said switching means so as to give said AC motor an AC voltage from said main electric power conversion unit; and
    in a load driving mode, said controller makes said auxiliary electric power conversion unit act as an inverter to give said load an output voltage.

12. An electric vehicle control device according to claim 11, further comprising:

means for detecting troubles in said main electric power conversion unit;

wherein responding to detection of a trouble by said means for detecting troubles, said controller makes said auxiliary electric power conversion unit act as an inverter and controls said switching means so as to give said AC motor an AC voltage from said auxiliary electric power conversion unit.

13. An electric vehicle control device according to claim 11, further comprising:

means for detecting troubles in said main electric power conversion unit;

means for informing a driver of the vehicle of a trouble in said main electric power conversion unit, responding to detection of the trouble by said means for detecting troubles; and means for instructing said controller to give said AC motor the AC voltage from said auxiliary electric power conversion unit in lieu of said main electric power conversion unit;

wherein responding to an instruction from said instructing means, said controller makes said auxiliary electric power conversion unit act as an inverter and controls said switching means so as to give said AC motor the AC voltage from said auxiliary electric power conversion unit.

14. An electric vehicle control device according to claim 11, wherein said controller determines that the vehicle is in a running mode, when a key switch is turned on.

15. An electric vehicle control device according to claim 11, wherein said controller determines that the vehicle is in a load driving mode, when a key switch is turned off and further load drive is instructed by means for instructing the load drive.

16. An electric vehicle control device comprising:

an AC motor for driving a vehicle;

a main electric power conversion unit for supplying an AC voltage to said AC motor;

a battery for supplying a DC voltage to said main electric power conversion unit;

an auxiliary electric power conversion unit connected to said battery and at the same time to a load to supply a voltage to the load;

switching means for applying the voltage to said motor selectively from one of said main and auxiliary electric power conversion units; and a controller for controlling said switching means.

17. An electric vehicle control device according to claim 16, wherein in a running mode of the electric vehicle, said controller controls said switching means so as to give said AC motor an AC voltage from said main electric power conversion unit, and further in a load driving mode, to give said load an output voltage from said auxiliary electric power conversion unit.

18. An electric vehicle control device according to claim 17, further comprising:

means for detecting troubles in said main electric power conversion unit;

wherein said controller controls said switching means so as to give said AC motor an AC voltage from said auxiliary electric power conversion unit, responding to detection of a trouble by said means for detecting troubles.

19. An electric vehicle control device according to claim 17, further comprising:

means for detecting troubles in said main electric power conversion unit;

means for informing a driver of the vehicle of a trouble in said main electric power conversion unit, responding to detection of the trouble by said means for detecting troubles; and means for instructing said controller to give said AC motor the AC voltage from said auxiliary electric power conversion unit in lieu of said main electric power conversion unit;

wherein said controller controls said switching means so as to give said AC motor the AC voltage from said auxiliary electric power conversion unit, responding to an instruction from said instructing means.

20. An electric vehicle control device according to claim 17, wherein said controller determines that the vehicle is in a running mode, when a key switch is turned on.

21. An electric vehicle control device according to claim 17, wherein said controller determines that the vehicle is in a load driving mode, when a key switch is turned off and further load drive is instructed by means for instructing the load drive.

* * * * *